US010480969B2

(12) United States Patent
Fink et al.

(10) Patent No.: US 10,480,969 B2
(45) Date of Patent: Nov. 19, 2019

(54) FIELD DEVICE OF MEASURING- AND AUTOMATION TECHNOLOGY

(71) Applicant: Endress + Hauser Flowtec AG, Reinach (CH)

(72) Inventors: Nikolai Fink, Aesch (CH); Frank Bonschab, Rummingen (DE); Markus Beissert, Auggen (DE)

(73) Assignee: ENDRESS + HAUSER FLOWTEC AG, Reinach (CH)

( * ) Notice: Subject to any disclaimer, the term of this patent is extended or adjusted under 35 U.S.C. 154(b) by 274 days.

(21) Appl. No.: 15/457,463

(22) Filed: Mar. 13, 2017

(65) Prior Publication Data
US 2017/0268914 A1   Sep. 21, 2017

(30) Foreign Application Priority Data

Mar. 15, 2016   (DE) .......... 10 2016 104 739

(51) Int. Cl.
*G01F 1/84*   (2006.01)
*G01F 1/58*   (2006.01)

(52) U.S. Cl.
CPC ............ *G01F 1/586* (2013.01); *G01F 1/8418* (2013.01); *G01F 1/8422* (2013.01)

(58) Field of Classification Search
CPC ...... G01F 1/586; G01F 1/8418; G01F 1/8422; G01F 15/00; G01F 1/58; G01F 1/8427
USPC .. 73/861.08–861.17, 861.354–861.357, 431; 439/181–187, 278–283, 936, 894
See application file for complete search history.

(56) References Cited

U.S. PATENT DOCUMENTS

| 4,166,664 A * | 9/1979 | Herrmann, Jr. .... H01R 13/6276 439/258 |
| 5,342,995 A | 8/1994 | Comerci |
| 6,109,979 A * | 8/2000 | Garnett ................ H01R 13/527 439/573 |
| 6,641,417 B2 | 11/2003 | Tanaka |
| 7,894,175 B2 | 2/2011 | Florin |
| 9,030,190 B2 | 5/2015 | Matt |
| 9,541,428 B2 | 1/2017 | Fink |
| 2003/0027447 A1 * | 2/2003 | Cooper ................. H01R 13/53 439/181 |

FOREIGN PATENT DOCUMENTS

| DE | 4221137 A1 | 1/1994 |
| DE | 102006009827 A1 | 9/2007 |

(Continued)

OTHER PUBLICATIONS

German Search Report, German Patent Office, Munich, Germany, dated Nov. 11, 2016.

*Primary Examiner* — Robert R Raevis
(74) *Attorney, Agent, or Firm* — Bacon & Thomas, PLLC

(57) ABSTRACT

A field device of measuring- and automation technology, which field device meets requirements for operation in explosion-endangered environments. Safe operation of the field device in explosion-endangered environments is assured by a pluggable connector coupling for electrical coupling of different field device components. An essential feature of the pluggable connector coupling is a sealing element for spatial and gas-tight sealing of a contact region of contacting elements of the pluggable connector coupling from a free volume remaining in the pluggable connector coupling.

10 Claims, 3 Drawing Sheets

(56) References Cited

FOREIGN PATENT DOCUMENTS

| | | |
|---|---|---|
| DE | 60223623 T2 | 10/2008 |
| DE | 102012005637 A1 | 9/2013 |
| DE | 102012108415 A1 | 6/2014 |
| GB | 2334794 * | 1/1999 |

* cited by examiner

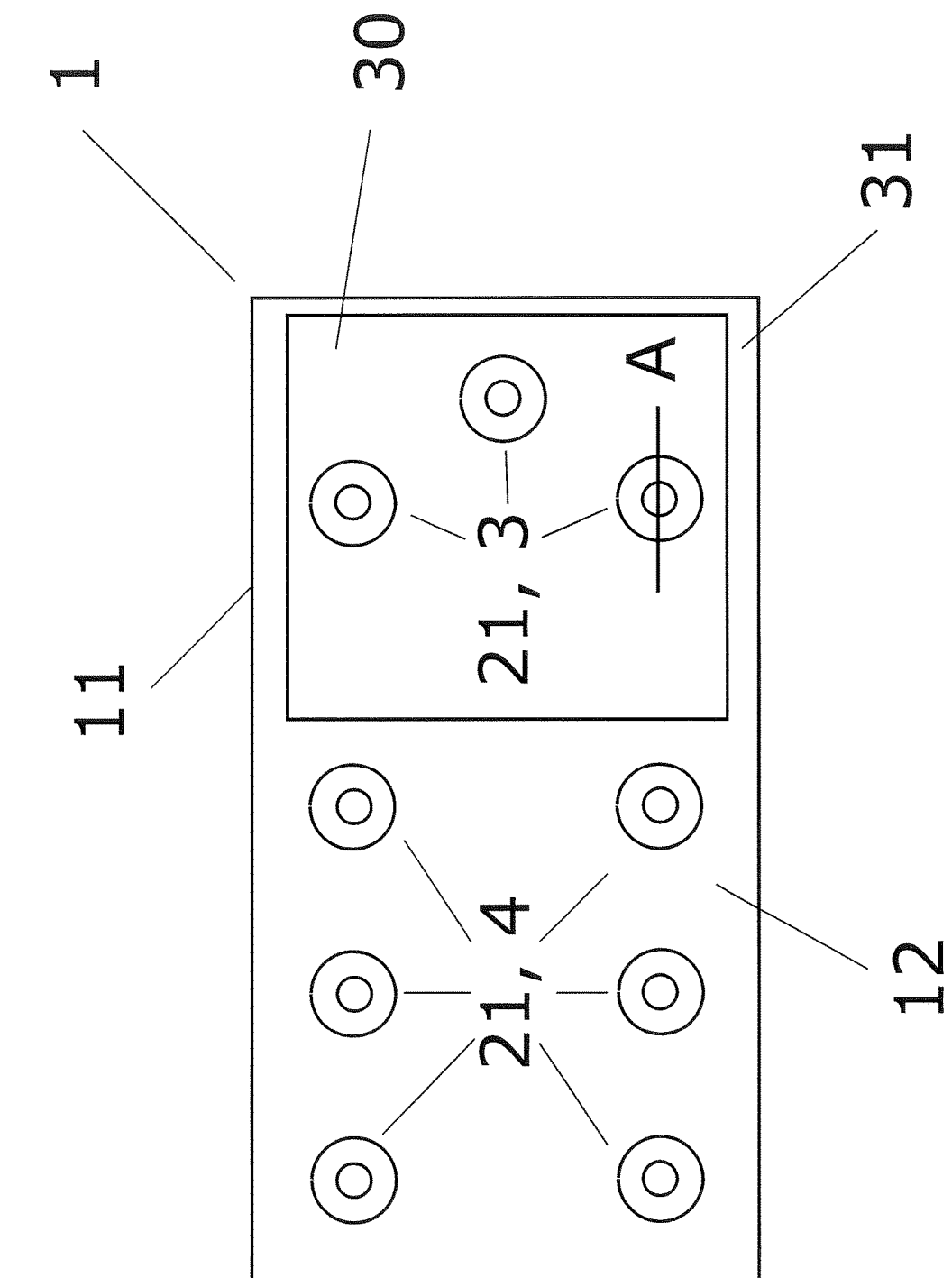

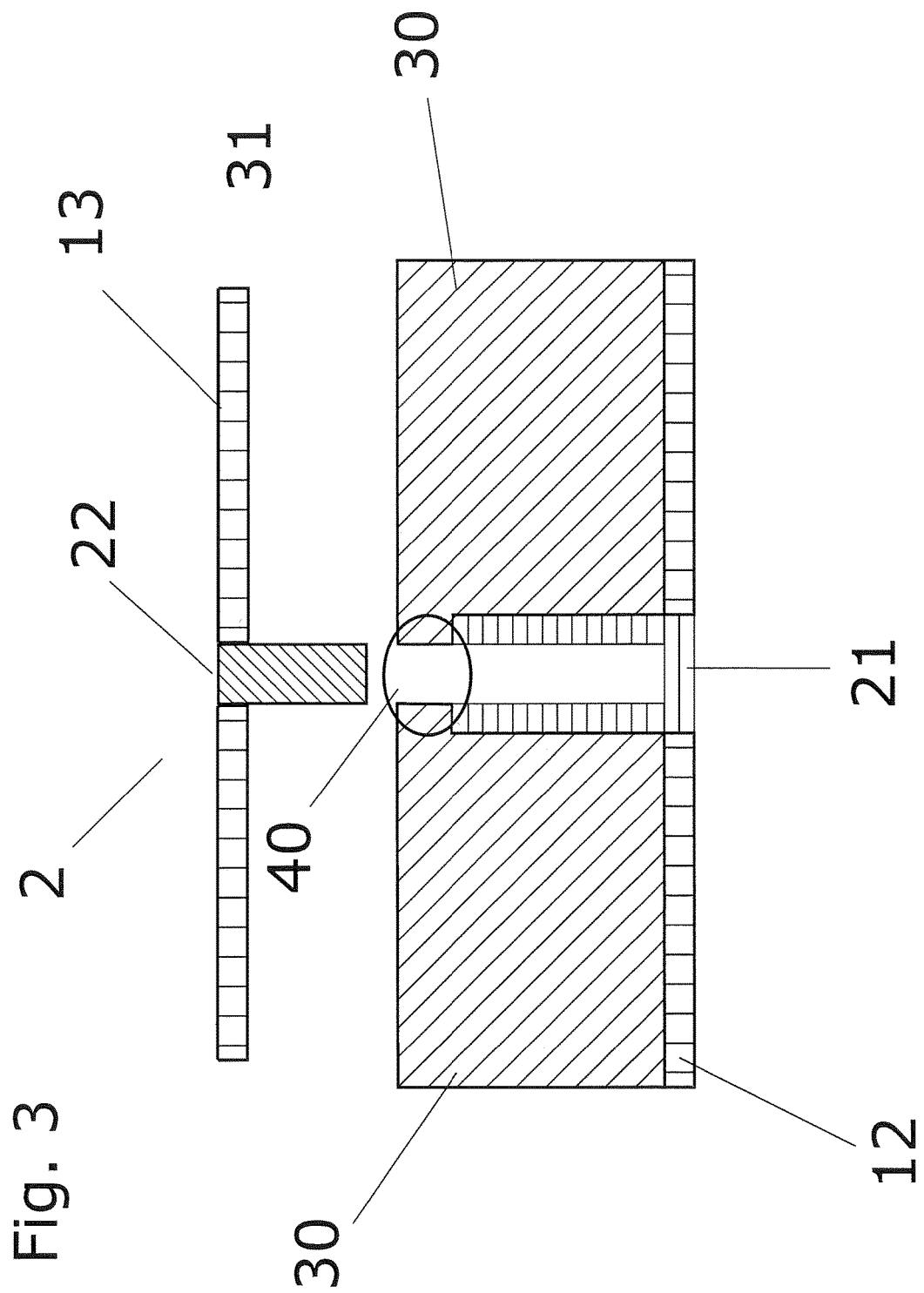

FIELD DEVICE OF MEASURING- AND AUTOMATION TECHNOLOGY

TECHNICAL FIELD

The invention relates to a field device of measuring- and automation technology, which field device meets requirements for operation in explosion-endangered environments.

BACKGROUND DISCUSSION

Field devices of measuring- and automation technology work according to different measuring principles, as a function of the physical variable to be measured. Frequently, in such case, a spatial isolation between a measuring system and an operating electronics is used, wherein the measuring system and the operating electronics are connectable by a separable, pluggable connector coupling for establishing electrical contact.

Plug couplings are known. For example, German Patent, DE102013113635A1 discloses a pluggable connector coupling for establishing electrical contact between a sensor module and a cable circuit module.

In environments with potentially explosive atmospheres, plug couplings are critical elements, since a plugging together or separating of plug couplings can cause an arc to form. Also, during operation of a field device, possibly occurring malfunctions may lead to arcing in the region of the pluggable connector coupling. A potting compound, which surrounds the pluggable connector coupling, such as disclosed in German Patent, DE102013113258A1, can keep explosive gases away from the pluggable connector coupling, so that an arcing has no negative effects. However, the applying of a potting compound means an additional working step in the final assembly of a field device and gets in the way of easy mounting of the field device.

SUMMARY OF THE INVENTION

An object of the present invention is, consequently, a field device having an explosion preventing, pluggable connector coupling, which avoids the above mentioned disadvantages of a potting material.

The object is achieved according to the invention by an apparatus which resides in a field device, comprising: a modular housing having at least a first housing module having at least a first housing chamber and a second housing module having at least a second housing chamber, wherein the first housing module is connectable with the second housing module via at least one explosion preventing, pluggable connector coupling, wherein the pluggable connector coupling has a first coupling element and a second coupling element; a sensor system for registering a measured variable dependent effect; an excitation unit for producing a measured variable dependent effect registrable by the sensor system; an electronic operating circuit electrically coupled with the sensor system and with the excitation unit; wherein the electronic operating circuit is arranged in the first housing module, wherein the sensor system and the excitation unit are arranged at least partially in the second housing module; wherein the electrical coupling of the excitation unit and the sensor system with the operating electronics is assured by the pluggable connector coupling, wherein the first coupling element and the second coupling element each have at least one contacting element for establishing the electrical coupling by bringing together the at least one contacting element of the first coupling element with the at least one contacting element of the second coupling element, characterized in that the free volume remaining between the coupling elements after the bringing together of the first coupling element with the second coupling element is at least partially filled by a sealing element, wherein the sealing element seals at least one pair of electrical coupling establishing, contacting elements completely from the remaining volume.

In an embodiment of the field device, the sealing element is a synthetic material, wherein the synthetic material has a chemical durability, which satisfies the approval standard, FM Approvals, class 3600 point 4.2 of the year 2011.

In an embodiment of the field device, the first coupling element and the second coupling element each has a first set of contacting elements having at least one contacting element and a second set of contacting elements having at least one contacting element for establishing the electrical coupling, wherein the excitation unit is coupled with the operating circuit via the first set of contacting elements and wherein the sensor system is coupled with the operating circuit via the second set of contacting elements.

In an embodiment of the field device, the sealing element seals at least one pair of electrical coupling establishing, contacting elements of the first set of contacting elements completely from the remaining volume.

In an embodiment of the field device, the sealing element seals, in each case, a pair of contacting elements completely from the remaining volume.

In an embodiment of the field device, the complete sealing of the pair of contacting elements excludes inclusion of an air volume.

In an embodiment of the field device, the excitation unit is a magnet system for producing a measuring tube vibration in a Coriolis flow measuring device, and the sensor system is a magnet system for registering a measuring tube vibration in a Coriolis flow measuring device.

In an embodiment of the field device, the excitation unit is a magnet system for producing an induced voltage in a medium in a magneto-inductive flow measuring device.

In an embodiment of the field device, the pluggable connector coupling includes a mechanism, which prevents release of the coupling elements by tension.

In an embodiment of the field device, the sealing element is deformable, so that the sealing element is deformed in the case of bringing together of the first coupling element with the second coupling element.

In an embodiment of the field device, the sealing element is at least partially elastic and after release of the first coupling element from the second coupling element returns at least partially to its starting shape.

In an embodiment of the field device, the sealing element is plastic and retains its geometric form after release of the first coupling element from the second coupling element.

In an embodiment of the field device, the sealing element is matched to the shape of the pluggable connector coupling.

The present invention thus provides a field device with an explosion preventing, pluggable connector coupling.

BRIEF DESCRIPTION OF THE DRAWINGS

The invention will now be explained in greater detail based on an example of an embodiment. The figures of the drawing show as follows:

FIG. 2 shows a schematic plan view of a coupling element of a pluggable connector coupling of a field device of the invention with female contacting elements;

FIG. 3 shows a section through a pair of electrical coupling establishing, contacting elements.

DETAILED DISCUSSION IN CONJUNCTION WITH THE DRAWINGS

Figure 1:
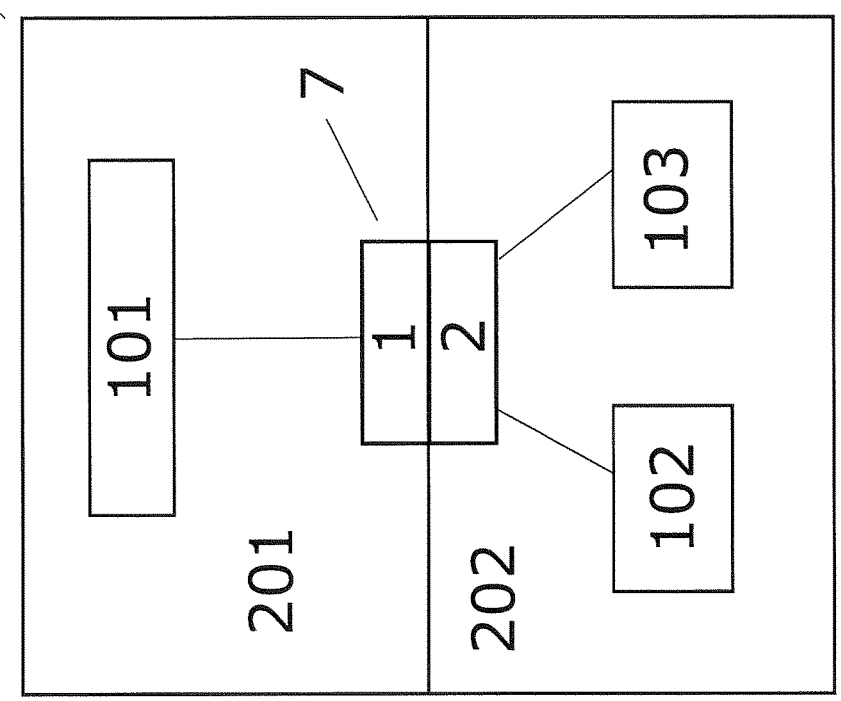
FIG. 1 shows schematically, a field device with a housing having two housing modules.

FIG. 1 shows a schematically a field device with a housing 200 having a first housing module 201 and a second housing module 202, wherein the first housing module 201 has an electronic operating circuit 101, and wherein the second housing module has a sensor system 102 and an excitation unit 103. The electrical coupling of the sensor system 102 and the excitation unit 103 with the electronic operating circuit 101 is provided by a pluggable connector coupling 7. The pluggable connector coupling 7 includes a first coupling element 1 and a second coupling element 2.

FIG. 2 shows a plan view of a coupling element 1 of a pluggable connector coupling with contacting elements 21, which are, for example, female, wherein the contacting elements pass through a rear wall 12, and with a wall 11, which completely surrounds the contacting elements 21 in a section perpendicular to the plan view, wherein the contacting elements 21 comprise a first set of contacting elements 3 and a second set of contacting elements 4 and wherein the first set of contacting elements 3 is surrounded by a sealing element 30 of the invention. Sealing element 30 seals the first set of contacting elements 3 completely from a free volume 31 between the coupling elements remaining in the case of bringing the coupling element 1 together with a matching coupling element 2 with male contacting elements (not shown).

The first set of contacting elements 3 is adapted, for example, to couple the excitation unit 103 of the field device electrically with the operating circuit 101 of the field device for producing a measured variable dependent effect registrable by the sensor system 102 of the field device.

The second set of contacting elements 4 is adapted, for example, to couple the sensor system 102 of the field device electrically with the operating electronics. The cutting plane A indicates the section shown in FIG. 3 through a pair of electrical coupling establishing, contacting elements 21, wherein a pair of contacting elements comprises a female contacting element 21 and a male contacting element 22 (not shown in FIG. 2).

FIG. 3 shows the section A through a pair of electrical coupling establishing, contacting elements having a female contacting element 21 and a male contacting element 22, wherein the female contacting element 21 extends through the rear wall 12 of the first coupling element 1 and is surrounded on its outside in the region of the remaining free volume 31 completely by the sealing element 30 and wherein the male contacting element 22 extends through a rear wall 13 of a second coupling element 2. Upon introduction of the male contacting element 22 into the sealing element 30, the region of the contact between the two contacting elements 21 and 22 is completely sealed from the remaining free volume 31. In such case, an opening 40 of the sealing element 30 for accommodating the male contacting element 22 in a state of separated coupling elements can have a smaller diameter than the male contacting element 22, so that in the case of bringing the coupling elements together gaps and passageways from the free volume 31 to the female contacting element 21 are prevented.

Sealing element 30 fulfills two functions in such case. On the one hand, an arcing in the case of establishing contact between the male contacting element 22 and the female contacting element 21 cannot ignite the free volume 31. On the other hand, the sealing element 30 blocks penetration of explosive gases into the region of contact between the male contacting element 22 and the female contacting element 21.

The field device of the invention with the explosion preventing, pluggable connector coupling exhibits thus a double explosion prevention.

Especially in the case of the first set of contacting elements 3, which, for example, is adapted to couple an excitation unit of a field device with an operating circuit of the field device electrically for producing a measured variable dependent effect registrable by a sensor system of the field device, a high power requirement can be present, so that the risk of arcing is increased. In this case, a separable, pluggable connector coupling 7 of the invention with sealing element 30 safely assures a significant lessening of the explosion danger.

The invention claimed is:

1. A field device of measuring- and automation technology, comprising:
   a modular housing having at least a first housing module having at least a first housing chamber and a second housing module having at least a second housing chamber, wherein said first housing module is connectable with said second housing module via at least one pluggable connector coupling, wherein said at least one pluggable connector coupling has a first coupling element and a second coupling element;
   a sensor system for registering a measured variable dependent effect;
   an excitation unit for producing the measured variable dependent effect registrable by said sensor system; and
   an electronic operating circuit electrically coupled with said sensor system and with said excitation unit, wherein:
   said electronic operating circuit is arranged in said first housing module;
   said sensor system and said excitation unit are arranged at least partially in said second housing module;
   an electrical coupling of said excitation unit and said sensor system with said operating electronics is assured by said at least one pluggable connector coupling;
   said first coupling element and said second coupling element each have at least one contacting element for establishing an electrical coupling by bringing together said at least one contacting element of said first coupling element with said at least one contacting element of said second coupling element;
   a free volume remaining between said first coupling elements and said second coupling element after the bringing together of said first coupling element with said second coupling element is at least partially filled by a sealing element, said sealing element seals at least one pair of contacting elements for establishing an electrical connection completely from said remaining volume;
   wherein said excitation unit is a magnet system for producing a measuring tube vibration in a Coriolis flow measuring device; and said sensor system is a magnet system for registering a measuring tube vibration in a Coriolis flow measuring device; or
   wherein said excitation unit is a magnet system for producing an induced voltage in a medium in a magneto-inductive flow measuring device and wherein said sensor system is arranged for registering said induced voltage.

2. The field device as claimed in claim 1, wherein:
said first coupling element and said second coupling element each has a first set of contacting elements having at least one contacting element and a second set of contacting elements having at least one contacting element for establishing electrical coupling;
said excitation unit is coupled with said operating circuit via said first set of contacting elements; and
said sensor system is coupled with said operating circuit via said second set of contacting elements.

3. The field device as claimed in claim 2, wherein:
said sealing element seals at least one pair of contacting elements for establishing an electrical connection of said first set of contacting elements completely from said remaining volume.

4. The field device as claimed in claim 1, wherein:
said sealing element seals said pair of contacting elements from said remaining volume.

5. The field device as claimed in claim 4, wherein:
the complete sealing of the pair of contacting elements excludes inclusion of an air volume.

6. The field device as claimed in claim 1, wherein:
said pluggable connector coupling includes a mechanism, which prevents release of the coupling elements by tension.

7. The field device as claimed in claim 1, wherein:
said sealing element is deformable, so that said sealing element is deformed in the case of bringing together of said first coupling element with said second coupling element.

8. The field device as claimed in claim 7, wherein:
said sealing element is at least partially elastic and after release of said first coupling element from said second coupling element returns at least partially to its starting shape.

9. The field device as claimed in claim 7, wherein:
said sealing element is plastic and retains its geometric form after release of said first coupling element from said second coupling element.

10. The field device as claimed in claim 1, wherein:
said sealing element is matched to the shape of said pluggable connector coupling.

* * * * *